United States Patent [19]

Avdeenko et al.

[11] 4,298,900

[45] Nov. 3, 1981

[54] OVERVOLTAGE PROTECTIVE DEVICE

[76] Inventors: Boris K. Avdeenko, prospekt Lunacharskogo, 70, korpus 1, kv. 55; Aron I. Bronfman, ulitsa Burenina, 3, kv. 108; Alexandr L. Vitkin, ulitsa Krasnoi Konnitsky, 18, kv. 1; Boris N. Zelentsov, Liteiny prospekt, 24, kv. 31, all of Leningrad; Valery N. Kinevsky, ulitsa Chernyshevskogo, 96, kv. 71, Kharkov; Vladimir E. Rozet, Kljuchevaya ulitsa, 21, kv. 20, Leningrad, all of U.S.S.R.

[21] Appl. No.: 109,112

[22] Filed: Jan. 2, 1980

[51] Int. Cl.[3] .............................................. H02H 3/22

[52] U.S. Cl. .................................... 361/127; 361/117

[58] Field of Search ........................ 361/117, 126–130

[56] References Cited

U.S. PATENT DOCUMENTS

| | | | |
|---|---|---|---|
| 2,264,699 | 12/1941 | Johnson et al. | 361/127 |
| 3,586,914 | 6/1971 | Foitzik | 361/127 |
| 3,805,114 | 4/1974 | Matsuoka et al. | 361/127 |
| 4,100,588 | 7/1978 | Kresge | 361/127 |
| 4,223,366 | 9/1980 | Sweetana et al. | 361/127 |

FOREIGN PATENT DOCUMENTS

| | | | |
|---|---|---|---|
| 2324744 | 6/1974 | Fed. Rep. of Germany | 361/127 |
| 2804617 | 9/1978 | Fed. Rep. of Germany | 361/127 |

*Primary Examiner*—Harry E. Moose, Jr.

*Attorney, Agent, or Firm*—Fleit & Jacobson

[57] ABSTRACT

An overvoltage protective device comprises an insulating housing accommodating thereinside at least one column of non-linear resistors and a dielectric bush, both of which are closely enveloped by thermally conductive dielectric bulk material being in contact with the inner surface of the insulating housing. The wall of the housing of the dielectric bush is provided with through openings blocked by a layer of dielectric material. The inner surface of the dielectric bush forms a gas vent channel arranged lengthwise with respect to the column of non-linear resistors.

5 Claims, 17 Drawing Figures

OVERVOLTAGE PROTECTIVE DEVICE

FIELD OF THE INVENTION

The present invention relates to electrical engineering, and more specifically to overvoltage protective devices.

The present invention can be exploited to the utmost advantage to provide the protection of the insulation of the electric equipment incorporated in stations and substations as well as in a.c. and d.c. power transmission lines from lightning and switching voltage surges.

BACKGROUND OF THE INVENTION

It is well known that under normal service conditions the insulation of a.c. and d.c. electric equipment is exposed to the impact of operating voltage of the electric network system.

However, for a variety of different reasons one or another part of the electric system is liable to undergo a momentary increase in voltage being much in excess of that used under normal service conditions, which consequently gives rise to overvoltage phenomena. Should the amplitude of this overvoltage reach a substantial value it may present a hazard to the insulation of the electric installations of stations, substations and power transmission lines, in particular such overvoltage arising on the power transmission line are capable of damaging the insulation of the most expensive equipment items, i.e. electric machines, transformers, reactors, switching apparatus.

The suppression of the level of overvoltages arising on the power transmission line is accomplished by overvoltage protective devices, the application of which has now become vitally indispensible to the creation of power transmission lines of the highest voltage ratings.

It should be noted that the operational reliability of electric equipment is largely determined by and dependent on the operational reliability of overvoltage protective devices.

Known in the prior art is an overvoltage protective device (see the U.S. Pat. No. 3,805,114 issued in 1974) comprising a column of non-linear resistors mounted within an insulating housing. Between the non-linear resistors and the inner surface of the insulating housing there is provided a gap. The non-linear resistors are made from zinc oxide-based material.

The non-linear resistors are characterized by a non-linear voltage-current relationship and act as a low resistance to the flow of high-magnitude overvoltage-induced currents, thus limiting the voltage across the terminals of the overvoltage protective device, and as a high resistance under normal service conditions, thus limiting the magnitude of current flowing through the device from the electric network.

Under normal service conditions the current of a small magnitude supplied by the electric network passes through the overvoltage protective device in a continuous manner.

Upon the occurence of overvoltage in the electric network as a result of the high non-linearity inherent in the resistors the passage of large-magnitude overvoltage-induced currents through the overvoltage protective device results in a pronounced increase in voltage at the point of connection of the overvoltage protective device to the electric network. The overvoltage across the equipment connected to the electric network in parallel with the overvoltage protective device is thus limited.

Upon cessation of the overvoltage impact on the electric network a sharp increase in resistance of the non-linear resistors takes place, due to which through the overvoltage protective device is restored the passage of the original magnitude of the current from the electric network typical for normal service conditions.

However, the constant passage of current through the device is attended with the release of heat energy which should be dissipated to reduce the temperature of the non-linear resistors.

The air gap between the lateral surfaces of the non-linear resistors and the inner surface of the porcelain insulating housing affects the satisfactory heat removal from the non-linear resistors. Meanwhile, the protracted exposure of the non-linear resistors to voltage, particularly at elevated temperatures of the non-linear resistors results in the ageing of the material used for their fabrication, which leads in turn to a gradual decrease in resistance of the non-linear resistors and, therefore, to a build-up of the current flowing therethrough under the action of the electric network voltage. This may eventually cause a disturbance in the thermal balance of the overvoltage protective device and its complete failure, thus reducing the operational reliability of the device under consideration.

Furthermore, upon the occurrence of a short-circuit electric arc in the above air gap accompanying sparkover of the resistors there is generated a large amount of gas contacting directly the inner surface of the insulating housing, and inasmuch as the air gap is too small in transverse direction the gas being formed can not be removed rapidly from the overvoltage protective device, which results in an abrupt increase in pressure of the gas thus formed, creating heavy explosion hazards in the porcelain insulating housing. Moreover, direct contact between the electric arc and the gas having a high temperature brings about excessive heating of the insulating housing, which may also cause its destruction. All this taken together impairs severely the operational reliability of the above-described overvoltage protective device.

Also known in the prior art is an overvoltage protective device (see the U.S. Pat. No. 4,100,588 and the specification of a F.R.G. application No. 2,804,617 issued Sept. 21, 1978, U.S. claims priority of Mar. 16, 1977) comprising an insulating housing accommodating thereinside at least one column of non-linear resistors.

The greater portion of the longitudinal space between the column of non-linear resistors and the inner surface of the insulating housing is filled with thermally conductive dielectric material which closely envelops the column of non-linear resistors and is in contact with the inner surface of the insulating housing.

The thermally conductive dielectric material is a silicone rubber including alumina as a filler.

The lesser, not filled with the thermally conductive dielectric portion of the longitudinal space between the vacant inner surface of the insulating housing and the surface of the thermally conductive dielectric bulk material defines a gas vent channel arranged along the length of the column of the non-linear resistors.

The thermally conductive dielectric material improves heat contact between the non-linear resistors and the insulating housing, which ensures more effective removal of heat from the non-linear resistors as compared to the non-linear resistor heat removal system employed in the overvoltage protective device described hereinabove.

The gas vent channel allows an unhindered discharge of gas from the device, the pressure of the gas formed being less than the pressure which the insulating housing can withstand. This reduces the possibility of explosive destruction of the insulating housing.

However, similarly to the above-mentioned device, this prior art overvoltage protective device is deficient in that the short-circuit electric arc and the gas formed are also in direct contact with the inner surface of the insulating housing, which results in excessive heating of the insulating housing and its consequent cracking, this decreasing the mechanical strength of the insulating housing, whereby the pressure of the gas being formed may thus be sufficient to cause explosion of the insulating housing. Hence, this factor affects adversely the operational reliability of the overvoltage protective device.

Furthermore, the amount of labor and time taken by the procedure of filling the insulating housing with the thermally conductive dielectric material should be also noted. Thus, the thermally conductive dielectric material is poured into the insulating housing subsequent to the mounting of the column of non-linear resistors therein, whereafter the housing is turned over onto its lateral surface. Upon solidification and self-levelling of the thermally conductive dielectric material inside the insulating housing there is formed a gas vent channel. As the process takes place, the thermally conductive dielectric material should be prevented from penetrating into the space between the non-linear resistors.

SUMMARY OF THE INVENTION

It is an object of the present invention to provide an overvoltage protective device featuring improved operational reliability.

Another object of the present invention is to provide an overvoltage protective device featuring reduced labor consumption in the fabrication thereof.

The principal object of the present invention is to provide such an overvoltage protective device, wherein a gas vent channel is made in an insulating housing so that the inner surface of the insulating housing is not in contact with the short-circuit electric arc and with the gas being formed in case of sparkover of non-linear resistors and having a high temperature, while thermally conductive dielectric material is chosen such as to ensure effective suppression of the electric arc and not to require large amounts of labor and time for filling the insulating housing with it.

With these and other objects in view there is proposed an overvoltage protective device comprising an insulating housing accommodating thereinside at least one column of non-linear resistors closely enveloped by thermally conductive dielectric material contacting the inner surface of the insulating housing, and provided with a gas vent channel arranged along said column of non-linear resistors, wherein, according to the invention, said gas vent channel is formed by the inner surface of a dielectric bush disposed in the insulating housing and having its outer lateral surface closely enveloped by said thermally conductive dielectric material, the wall of the housing of the dielectric bush being provided with openings closed by a layer of dielectric material, while said thermally conductive dielectric material being thermally conductive dielectric bulk material.

The provision of the gas vent channel formed by the inner surface of the dielectric bush whose lateral surface is closely enveloped by the thermally conductive dielectric bulk material, prevents the short-circuit electric arc and gas having a high temperature from directly contacting the inner surface of the insulating housing. This keeps the insulating housing from heating to a temperature at which it may collapse.

The thermally conductive dielectric bulk material contributes to the suppression of the electric arc, which leads to a decrease in the amount of the gas being formed and, hence, to a decrease in the gas pressure exerted on the inner surface of the insulating housing. All this undoubtedly improves the operational reliability of the device.

Furthermore, the vacant space of the insulating housing can be easily and simply filled with thermally conductive dielectric bulk materials, which permits to simplify significantly the manufacturing process of the overvoltage protective device.

In order to reduce the labor consumption required for the fabrication of the dielectric bush, it is expedient that the housing of the dielectric bush be made integral with the layer of dielectric material, the housing being made from bundles of glass threads impregnated with a binder, and the dielectric layer, from separate glass threads also impregnated with a binder. The bundles of glass threads add to the mechanical strength of the dielectric bush housing, while the separate glass threads ensure the production of a thin layer of dielectric material capable of rupture under the pressure of the gas being formed.

Whenever there is not provided special equipment for manufacturing the dielectric bush from glass threads, it expedient that the housing of the dielectric bush be made from a fiber-glass plastic tube, and the layer of dielectric material, closing the openings in the wall of the housing be made from a tube of heat-shrinkable polyethylene.

In the case being considered such a fiber glass plastic tube is a commercially available item among the materials possessing high dielectric properties, while the tubes of heat-shrinkable polyethylene are cheap and readily available items among the known products made from heat-shrinkable materials. Moreover, such tubes of heat-shrinkable polyethylene feature a low temperature of thermal shrinkage which simplifies the fabrication of the layer of dielectric material on the surface of the dielectric bush housing.

It is expedient that the thermally conductive dielectric bulk material be quartz sand since it is the most available and cheapest material among those heat conductive dielectric bulk materials which are known up to date.

It is also expedient that the thermally conductive dielectric bulk material be a mixture including porcelain crumbs and small particles of alumina.

Such a mixture ensures better heat removal from the non-linear resistors then quartz sand and allows to utilize porcelain production waste materials.

These and other objects of the present invention will become more apparent upon consideration of the following detailed description of the overvoltage protective device and embodiments thereof with reference being made to the accompanying drawings, in which.

DETAILED DESCRIPTION OF THE INVENTION

Figure 1:
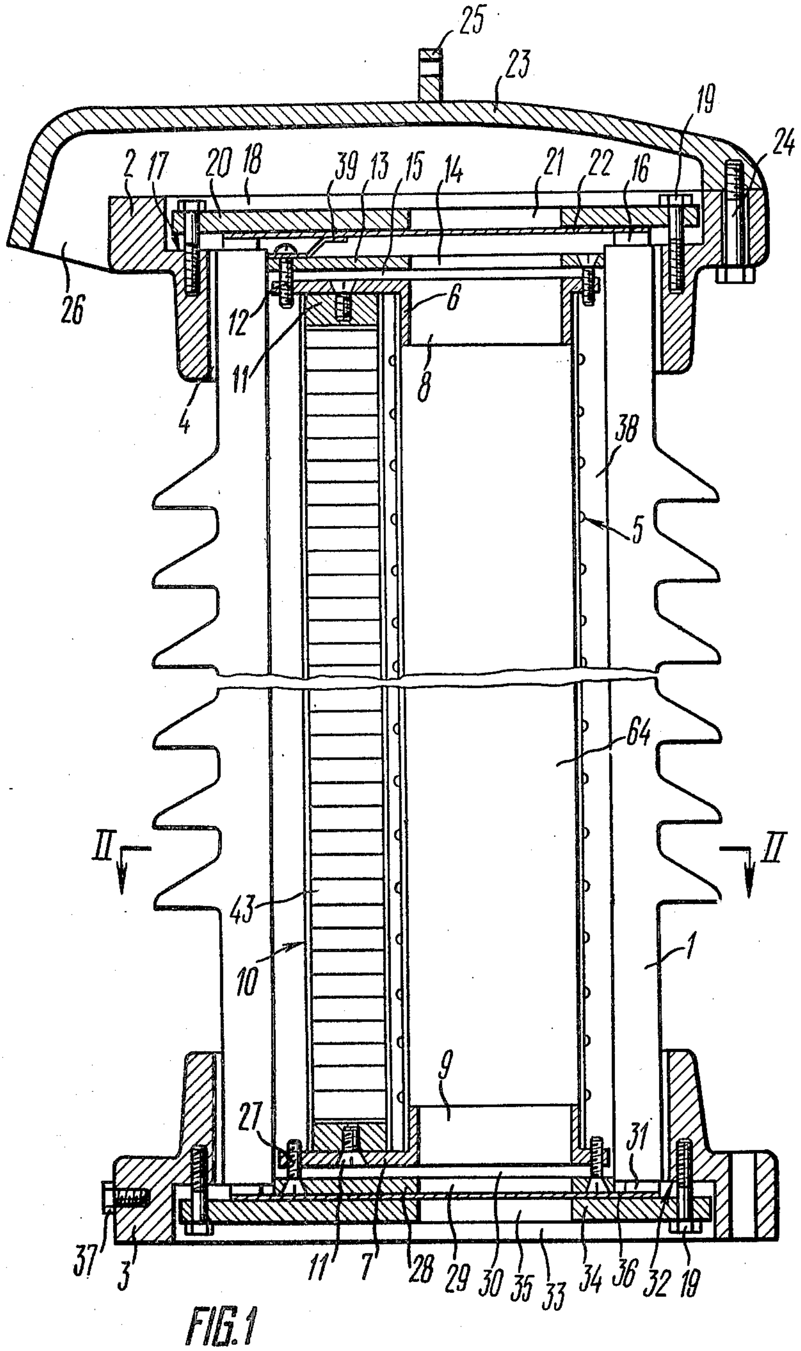
FIG. 1 illustrates an over voltage protective device comprising one column of non-linear resistor, longitudinal section.
Figure 2:
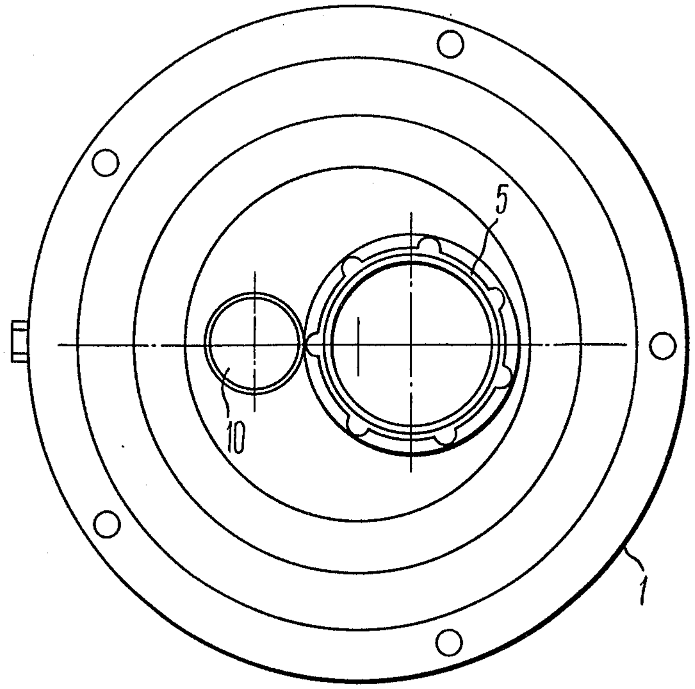
FIG. 2 is an overvoltage protective device shown in section along the line 11—11 of FIG. 1.

Referring now to FIG. 1, there is shown an overvoltage protective device comprising an insulating housing 1 made from porcelain. The insulating housing 1 has a top flange 2 and a bottom flange 3 which are respectively coupled by means of a cement mass 4 to the outer surface of the top and bottom ends of the insulating housing 1. Inside the insulating housing 1 there is arranged a dielectric bush 5 whose axis is displaced relative to the axis of the insulating housing 1 (FIG. 2). The dielectric bush 5 is provided with a top flange 6 and a bottom flange 7. The top flange 6 has an opening 8, while the bottom flange 7 has an opening 9. Between the top flange 6 and the bottom flange 7 of the dielectric bush 5 there is arranged a column 10 of non-linear resistors. The column 10 of non-linear resistors is connected to the top flange 6 and to the bottom flange 7 by means of screws 11.

A metal disc 13 is connected to the top flange 6 of the dielectric bush 5 by means of screws 12. The metal disc 13 has an opening 14 whose diameter equals the diameter of the opening 8 of the top flange 6 of the dielectric bush 6. Between the metal disc 13 and the top flange 6 there is provided a gasket 15 of polyurethane foamed plastic.

Mounted on the upper end surface of the insulating housing 1 is a ring 16 of rubber. Connected by screws 19 to the horizontal surface 17 of a recess 18 of the top flange 2 of the insulating housing 1 is a metal disc 20 having an opening 21 whose diameter equals the diameter of the opening 8 of the top flange 6 of the dielectric bush 5. Between the metal disc 20 and the rubber gasket 16 there is provided a disc 22 of brass. The inner recess 18 of the top flange 2 of the insulating housing 1 is closed by a cover 23 which is connected to the top flange 2 of the insulating housing 1 by means of screws 24. The cover 23 is provided with a line terminal 25 and openings 23 for gas discharge. Connected to the bottom flange 7 of the dielectric bush 5 by means of screws 27 is a metal disc 28. The disc 28 has an opening 29 whose diameter equals the diameter of the opening 9 of the bottom flange 7 of the dielectric bush 5.

Between the metal disc 28 and the bottom flange 7 of the dielectric bush 5 there is also provided a gasket 30 of polyurethane foamed plastic.

Contacting the lower end surface of the insulating housing 1 is a rubber ring 31. Connected by means of screws 19 to the horizontal surface 32 of a recess 33 of the bottom flange 3 of the insulating housing 1 is a metal disc 34 having an opening 35 whose diameter equals the diameter of the opening 9 of the bottom flange 7 of the dielectric bush 5. Between the metal disc 34 and the rubber gasket 31 there is provided a disc 36 of brass.

Connected to the bottom flange 3 of the insulating housing 1 is a terminal 37.

The space between the inner surface of the insulating housing 1 and the outer surface of the dielectric bush 5, as well as between the outer surfaces of the gaskets 15 and 30 of polyurethane foamed plastic is filled with thermally conductive dielectric bulk material 38 comprised of quartz sand which tightly envelops the lateral surface of the column 10 of non-linear resistors and the outer lateral surface of the dielectric bush 5.

The thermally conductive dielectric bulk material may be also comprised of a mixture including porcelain crumbs and small particles of alumina.

Between the disc 22 of brass and the metal disc 13 there is arranged a metal conductor 30 having its one end soldered to the disc 22 of brass and its other end connected by means of one of the screws 12 to the metal disc 13.

The column 10 of non-linear resistors (FIG. 3) comprises an insulating housing 40 inside which there are terminals 41 and 42. Between the terminals 41 and 42 are arranged electrically connected in series non-linear resistors 43. The terminals 41 and 42 have respectively threaded openings 44 and 45 receiving the screws 11 shown in FIG. 1, which connect the column 10 of non-linear resistors to the top flange 6 and to bottom flange 7 of the dielectric bush 5.

The insulating housing 40 tightly envelops the lateral surfaces of the non-linear resistors 43 and partially the outer end surfaces of the terminal 41 and terminal 42.

Figure 4:
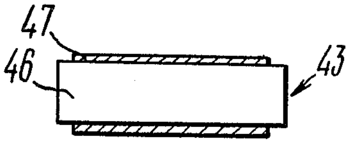
FIG. 4 illustrates a non-linear resistor, longitudinal section.

The terminals 41 and 42 are made in the form of metal discs. Each of the non-linear resistors 43 (FIG. 4) comprises as its active element a sintered body 46 made from ceramic material including zinc oxide as a main constituent. The end surfaces of the sintered body 46 have current-conducting electrode coatings 47.

Figure 5:
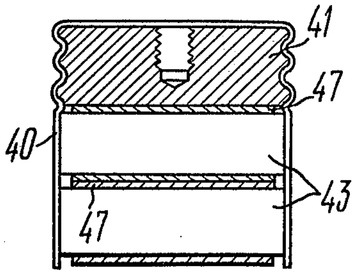
FIG. 5 illustrates a terminal and two non-linear resistors arranged in series and tightly enveloped by an insulating housing.

As it can be seen from FIG. 5, two of the non-linear resistors 43, arranged in series one after the other, are in mutual contact provided by means of the current-conducting electrode coatings 47.

Figure 3:
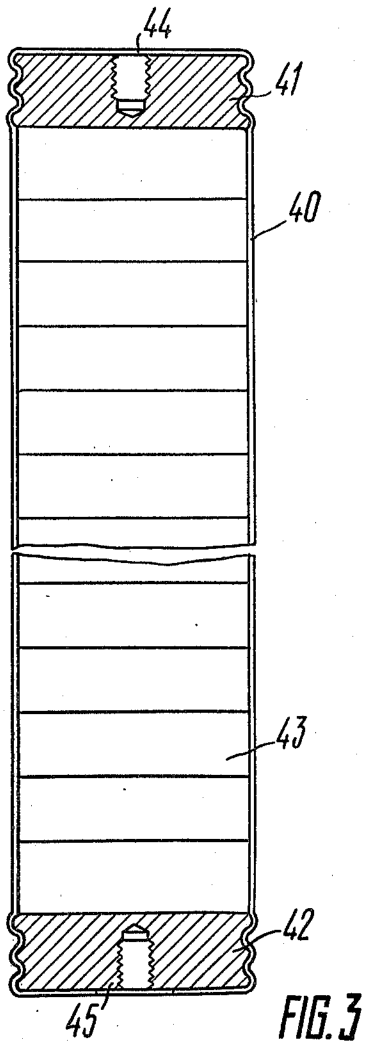
FIG. 3 illustrates a column of non-linear resistors whose lateral surfaces are tightly enveloped by an insulating housing of heat-shrinkable material, longitudinal section.

Furthermore, as will be seen also from FIG. 5, the terminal 41 is in contact with the current-conducting electrode coating 47 of the non-linear resistor 43 disposed thereunder. Respectively, the terminal 42 is in contact with the current-conducting electrode coating 47 of the non-linear resistor 43 disposed thereabove (FIG. 3). The terminal 41, the terminal 42 and the non-linear resistors 43 have equal diameters.

The insulating housing 40 is fabricated from heat-shrinkable material.

As is known, the heat-shrinkable material representing a polymeric composition, when previously subjected to irradiation and distension, is capable of a subsequent 1.5÷2-fold decrease in size upon its heating. The heat-shrinkable material has a thickness ranging from 0.5 to 1.5 mm.

The insulating housing 40 of the column 10 of non-linear resistors can be fabricated from a tube made from heat-shrinkable polyethylene.

This tube of heat-shrinkable polyethylene has a thickness of its wall of 1.5 mm and its inner diameter is less than the diameters of the non-linear resistors 43, the terminal 41 and the terminal 42 by 20–40%.

The length of the tube of heat-shrinkable polyethylene is somewhat larger than the total length of the terminal 41, the non-linear resistors 43 and the terminal 42 arranged in series one after the other as shown in FIG. 3.

Figure 6:
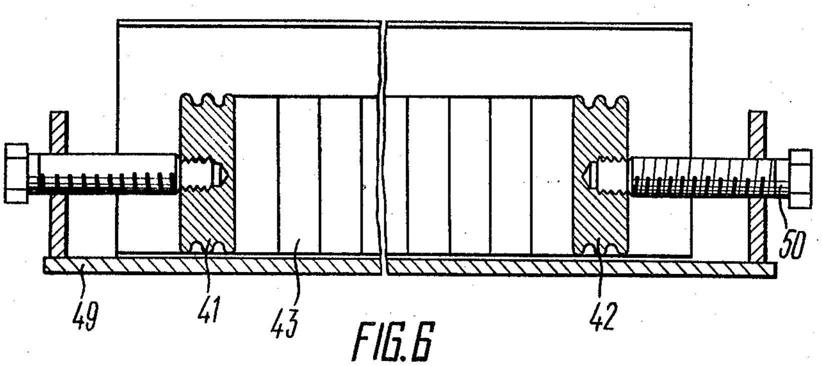
FIG. 6 illustrates a tray with clamping attachments on which there is mounted a distended tube of heat-shrinkable material, disposed inside the tube is a column of non-linear resistors and terminals tightened at both ends by the clamping attachments.

The tube of heat-shrinkable material is previously subjected to irradiation and further to distension, whereby the inner diameter of the tube of heat-shrinkable polyethylene subsequent to its distension becomes larger than the diameter of any of the non-linear resistors 43 by 20–40%. Then the distended tube of heat-shrinkable polyethylene designated in FIG. 6 by reference character 48 is located on a tray 49 provided with two clamping attachments 50.

Figure 7:
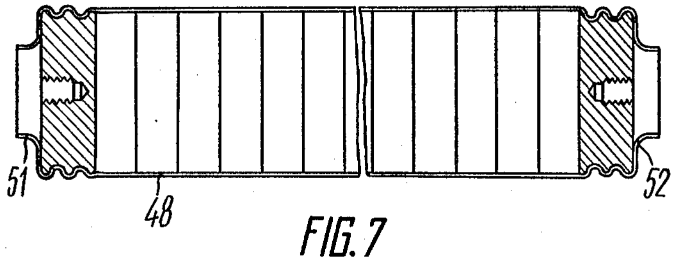
FIG. 7 illustrates a tube of heat-shrinkable material tightly enveloping the lateral surfaces of non-linear resistors, the free ends of the tube partially enveloping the outer end surfaces of the terminals.
Figure 8:
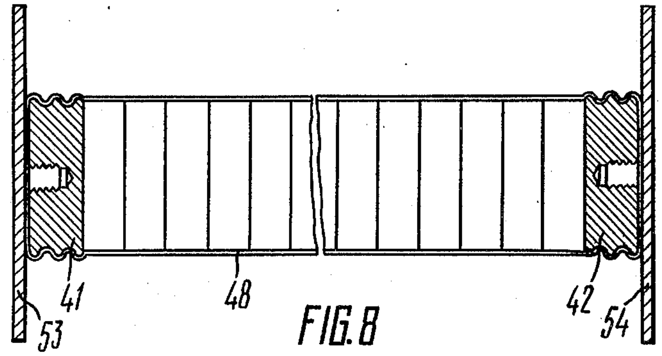
FIG. 8 illustrates a manner in which the free ends of the tube of heat-shrinkable material envelop the outer end surfaces of the terminals.

The column consisting of the terminal 41, the non-linear resistors 43 and the terminal 42 arranged in series one after the other is placed into the distended tube 48 of heat-shrinkable polyethylene in the sequence shown in FIG. 3. The column of the above components is tightened at both ends by means of the clamping attachments 50. The tube 48 of heat-shrinkable polyethylene is further heated by a blast of hot air having a temperature of 130° to 150° C., as a result of which the tube 48 of heat-shrinkable polyethylene shrinks and tightly envelops the lateral surfaces of the non-linear resistors 43, the terminal 41 and the terminal 42, as it is shown in FIG. 7. During the shrinkage, the free ends 51 and 52 of the tube 48 of heat-shrinkable polyethylene also partially envelop the outer end surfaces of the terminal 41 and the terminal 42. As shown in FIG. 8, a plate 53 is further pressed to the outer end surface of the terminal 41, while a plate 54 is pressed to the outer end surface of the terminal 42.

The plates 53 and 54 are preheated to a temperature of 130° to 150° C. As a result, the free ends 51 and 52 of the tube 48 of heat shrinkable polyethylene are completely pressed to the outer end surfaces of the terminals 41 and 42.

The process of shrinkage of the tube 48 of heat-shrinkable material and the pressing of its free ends 51 and 52 to the end surfaces of the terminals 41 and 42 give rise to longitudinal forces which press the non-linear resistors 43 against each other, and the terminals 41 and 42, against their respective non-linear resistors 43, thereby providing proper electric contact between these component.

The insulating housing 40 can be also fabricated from a tube of heat-shrinkable fluoroplastic.

In this case the fabrication of the insulating housing 40 will follow closely the pattern described hereinabove in connection with the use of heat-shrinkable polyethylene, the only exception being that the tube of heat-shrinkable fluorplastic will shrink upon heating to a temperature ranging from 250° to 350° C.

Figure 9:
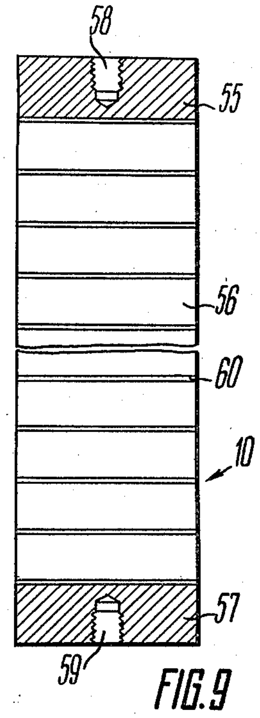
FIG. 9 illustrates another embodiment of a column of non-linear resistors, longitudinal section.
Figure 10:
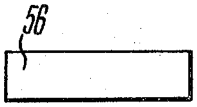
FIG. 10 illustrates a non-linear resistor, longitudinal section.

FIG. 9 shows the column 10 of non-linear resistors which is made up from a terminal 55, non-linear resistors 56 and a terminal 57 arranged in series one after the other. The terminals 55 and 57 are made in the form of metal discs and provided, respectively with threaded openings 58 and 59. Each of the non-linear resistors 56 (FIG. 10) represents a disc fabricated from ceramic material including zinc oxide as a main constituent.

As it can be seen from FIG. 9, between the end surfaces of each of the non-linear resistors 56 arranged in series one after the other, and also between the end surfaces of the terminals 55 and 57 and the non-linear resistors 56 adjacent thereto there are provided layers 60 of adhesive material featuring high electric conductivity. The layers 60 of adhesive material accomplish the bonding of these components and also ensure reliable electric contact between them.

Figure 11:
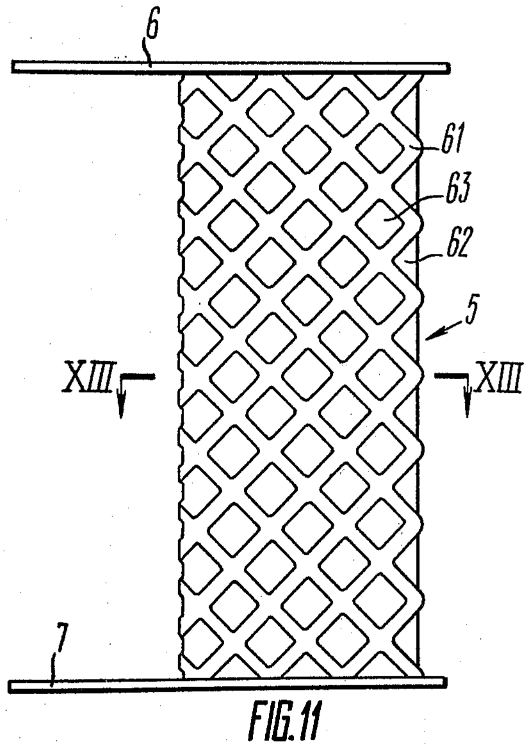
FIG. 11 is a general view of a dielectric bush according to one embodiment thereof.
Figure 12:
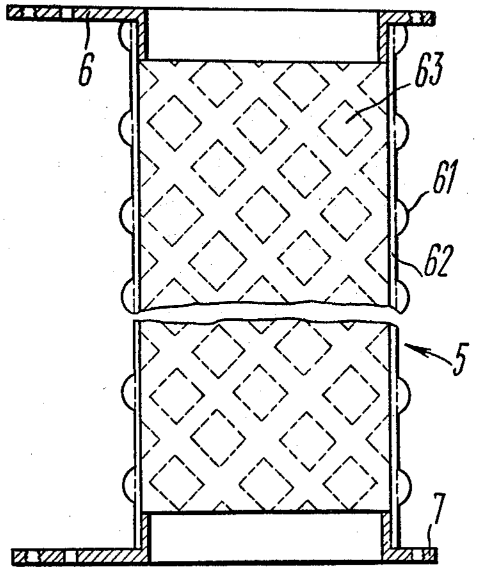
FIG. 12 illustrates the dielectric bush of FIG. 11, longitudinal section.
Figure 13:
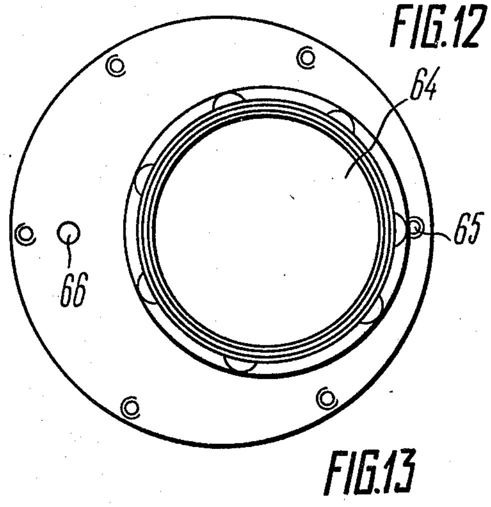
FIG. 13 illustrates a cross-sectional view of the same.

FIG. 11 shows a general view of the dielectric bush 5 and FIG. 12 is a longitudinal section of the same. As will be seen from FIGS. 11 and 12, the dielectric bush 5 comprises a housing 6 formed by bundles of glass threads impregnated with a binder and a layer 62 of dielectric material which is made integral with the housing 61 and formed by separate glass threads also impregnated with a binder. In intertwinding of the bundles of glass threads there are formed openings 63 of rectangular shape in the wall of the housing 61. The inner surface of the dielectric bush 5 (FIG. 13) defines a gas vent channel 64.

Connected by means of epoxy glue to the inner surface of the dielectric bush 5 (FIGS. 11 and 12) are the top metal flange 6 and the bottom metal flange 7 shown previously in FIG. 1.

The bottom flange 7 (FIG. 13) has a plurality of threaded openings 65 which are equidistant along the periphery, and a smooth opening 66. The top flange 6 (FIG. 12) has a plurality of threaded openings 67 which are equidistant along the periphery, and a smooth opening 68.

The openings 66 and 68 are located strictly opposite each other and serve for connecting the column 10 of non-linear resistors, as it is shown in FIG. 1.

Figure 14:
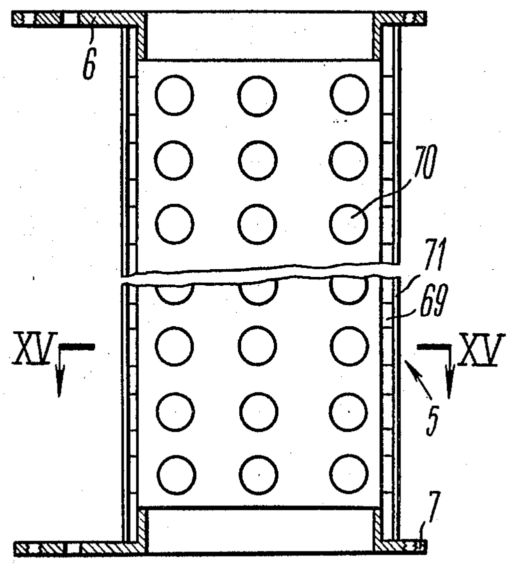
FIG. 14 illustrates another embodiment of, the dielectric bush longitudinal section.

In FIG. 14 there is illustrated another embodiment the dielectric bush 5 in a longitudinal section.

The dielectric bush 5 comprises a housing 69 made from a fiber-glass plastic tube. The wall of the housing 69 is provided with a plurality of through openings 70 uniformly distributed over the outer surface of the housing 69. The outer surface of the housing 69 is tightly enveloped by a layer 71 of dielectric material representing a tube of heat-shrinkable polyethylene.

Figure 15:
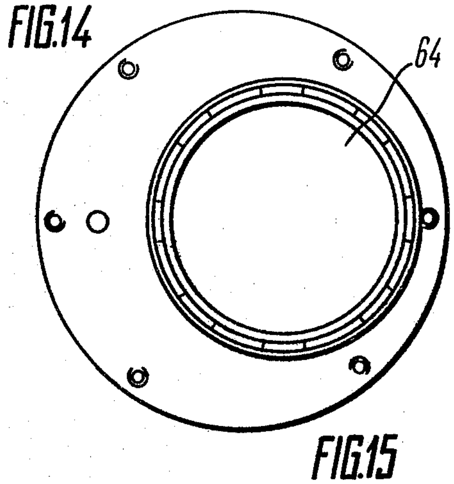
FIG. 15 is a section across XV—XV in FIG. 14.

The inner surface of the dielectric bush 5 (FIG. 15) defines the gas vent channel 64. Connected by means of epoxy glue to the inner surface of the housing 69 are the metal flanges 6 and 7 (FIG. 14).

Under normal service conditions, and also under overvoltage conditions current passes through the column 10 of the non-linear resistors causing the heating of the non-linear resistors 43 (FIG. 1). The heat from the non-linear resistors 43 is dissipated to the atmosphere through the thermally conductive dielectric bulk material 38 and the porcelain insulating housing 1.

If for this or that reason the column 10 of non-linear resistors is broken down, this will lead to the formation of a short-circuit electric arc accompanied concurrently by the release of gas. The pressure of the gas formed acts through the thermally conductive dielectric material 38 upon the inner surface of the insulating housing 1, and upon the layer 62 of dielectric material through the opening 63 in the wall of the housing 61 of the dielectric bush 5 (FIG. 11).

When the pressure of the gas increases in excess of that which the layer 62 of dielectric material withstands without destruction, the latter is broken through by the gas rushing into the gas vent channel 64 (FIG. 1). As this takes place the short-circuit electric arc strikes from the column 10 of non-linear resistors over the thermally conductive dielectric material 38 to the gas vent channel 64. Upon further increase in pressure of the gas formed within the gas vent channel 64 and upon achieving the gas pressure value in excess of that which the discs 22 and 36 of brass can withstand without destruction, the latter are broken through by the gas. Through the opening 21 in the disc 20 the gas rushes under the cover 23, and further through the opening 26 provided therein to the atmosphere. At the same time the gas is also released to the atmosphere through the opening 35 in the disc 34. However, it should be noted that the gas pressure value at which the brass discs 22 and 36, are ruptured does not exceed the pressure value which the insulating housing 1 withstands without destruction.

Figure 16:
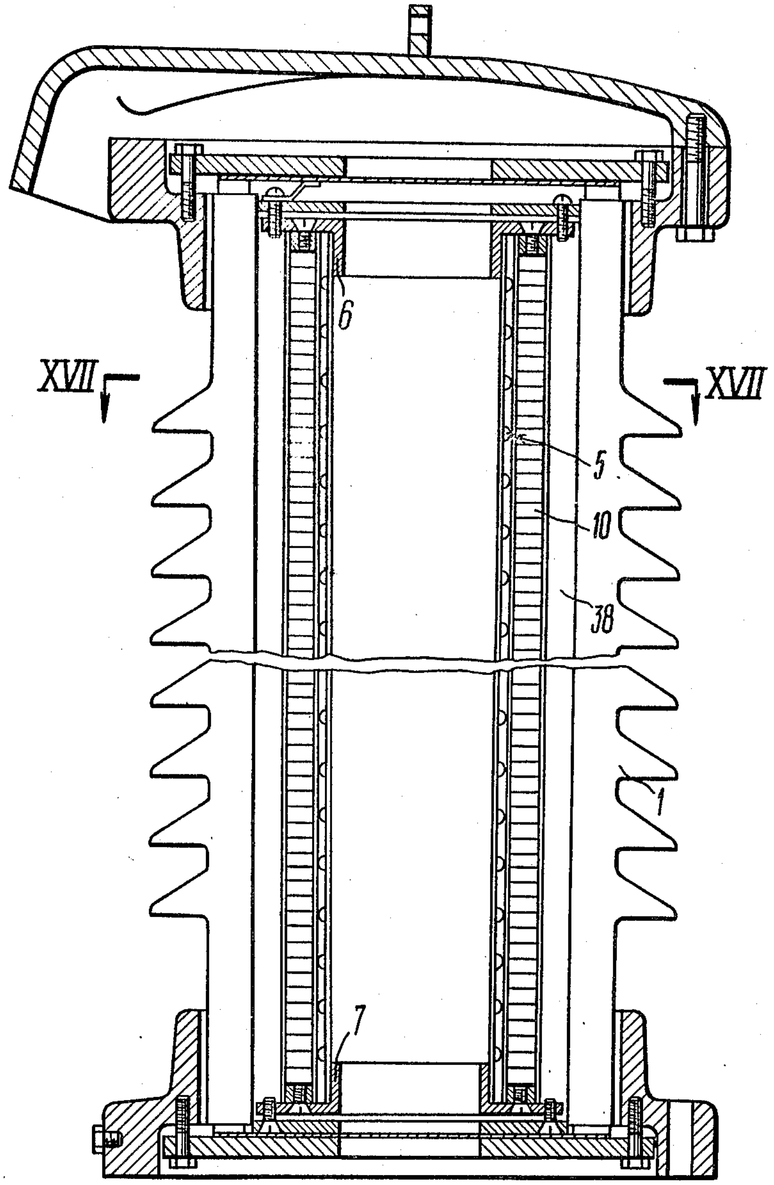
FIG. 16 illustrates an overvoltage protective device comprising a series of columns of non-linear resistors, longitudinal section.
Figure 17:
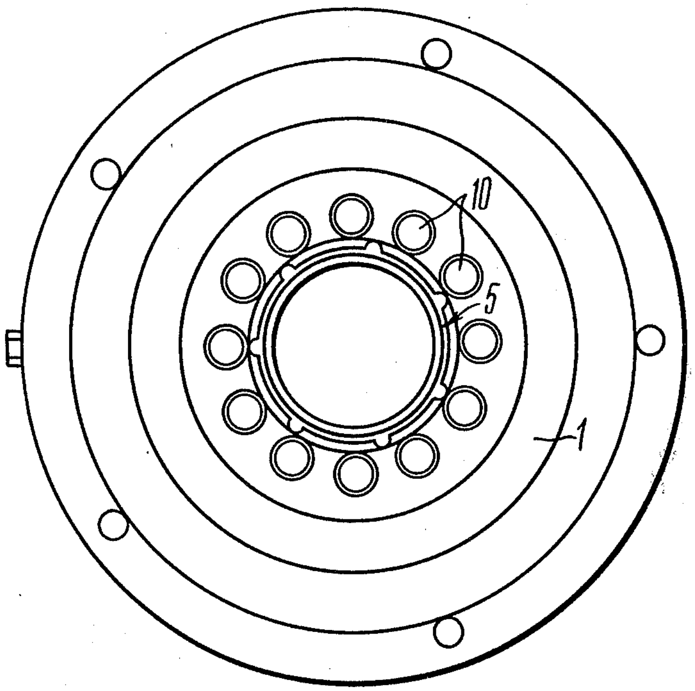
FIG. 17 is a section across XVII—XVII in FIG. 16.

In FIG. 16 there is shown in longitudinal section an overvoltage protection device comprising a number of columns 10 of non-linear resistors. Inside the insulating housing 1 there is arranged the dielectric bush 5 whose axis coincides with the axis of the insulating housing 1. Between the top flange 6 and the bottom flange 7 a number of the columns 10 of non-linear resistors is arranged. The columns 10 of non-linear resistors are uniformly spaced in relation to each other around the dielectric bush 5 (FIG. 17). The space between the inner surface of the insulating housing 1 and the outer surface of the dielectric bush 5 is filled with the thermally conductive dielectric material 38 tightly enveloping the lateral surfaces of the columns 10 of non-linear resistors. The operation of the overvoltage protective device according to this particular embodiment will be substantially similar to the operation of the device described hereinabove.

The foregoing embodiments of the present invention are used in an overvoltage protective device not provided with a set of spark gaps.

However, the present invention can also find beneficial application to an overvoltage protective device comprising spark gaps.

It is to be understood that the specific embodiments of the present invention disclosed and shown in the drawings hereinabove represent only possible preferred embodiments thereof and that a number of variations and modifications are also conceivable.

However, all such variations and modifications should be well within the scope of the following appended claims.

What is claimed is:

1. An overvoltage protective device comprising:
an insulating housing;
at least one column of non-linear resistors arranged inside said insulating housing;
a dielectric bush having a housing and arranged inside said insulating housing;
thermally conductive dielectric bulk material closely enveloping said column of non-linear resistors and said dielectric bush, said thermally conductive dielectric bulk material also being in contact with the inner surface of said insulating housing;
a gas vent channel defined by the inner surface of said dielectric bush and arranged lengthwise in relation to said column of non-linear resistors;
openings made in the wall of said housing of said dielectric bush;
a layer of dielectric material closing said openings.

2. An overvoltage protective device according to claim 1, wherein said housing of said dielectric bush and said layer of dielectric material of said dielectric bush are made integrally, said housing of said dielectric bush being fabricated from bundles of glass threads impregnated with a binder and said layer of said dielectric bush being formed from separate glass threads also impregnated with a binder.

3. An overvoltage protective device according to claim 1, wherein said housing of said dielectric bush is made from a fiber-glass plastics tube, while said layer of dielectric material of dielectric bush is made as a tube of heat-shrinkable polyethylene.

4. An overvoltage protective device according to claim 1, wherein said thermally conductive dielectric bulk material is quartz sand.

5. An overvoltage protective device according to claim 1, wherein said thermally conductive dielectric material is a mixture of porcelain crumbs and small particles of alumina.

* * * * *